Sept. 26, 1950 G. C. SOUTHWORTH 2,523,398

RADIO WAVE TRANSMISSION

Filed June 29, 1940 6 Sheets-Sheet 1

INVENTOR
G.C. SOUTHWORTH
BY
N. S. Ewing
ATTORNEY

Sept. 26, 1950 G. C. SOUTHWORTH 2,523,398

RADIO WAVE TRANSMISSION

Filed June 29, 1940 6 Sheets-Sheet 2

INVENTOR
G. C. SOUTHWORTH
BY
N. S. Ewing
ATTORNEY

Sept. 26, 1950 | G. C. SOUTHWORTH | 2,523,398

RADIO WAVE TRANSMISSION

Filed June 29, 1940 | 6 Sheets-Sheet 3

INVENTOR
G.C. SOUTHWORTH

BY N. D. Ewing

ATTORNEY

RADIO WAVE TRANSMISSION

Filed June 29, 1940 6 Sheets-Sheet 4

INVENTOR
G.C. SOUTHWORTH
BY N. S. Ewing
ATTORNEY

INVENTOR
G.C. SOUTHWORTH
BY
N. S. Ewing
ATTORNEY

Sept. 26, 1950 G. C. SOUTHWORTH 2,523,398

RADIO WAVE TRANSMISSION

Filed June 29, 1940 6 Sheets-Sheet 6

INVENTOR
G.C. SOUTHWORTH

BY

N. D. Ewing

ATTORNEY

UNITED STATES PATENT OFFICE 2,523,398

RADIO WAVE TRANSMISSION

George C. Southworth, Red Bank, N. J., assignor to Bell Telephone Laboratories, Incorporated, New York, N. Y., a corporation of New York Application June 29, 1940, Serial No. 343,118

22 Claims. (Cl. 343—9)

This invention relates to applications of radio waves to physical measurements. It is in part a continuation of my copending applications, Serial No. 743,753, filed September 12, 1934 (Patent 2,206,923, July 9, 1940), and Serial No. 223,424, filed August 6, 1938 (Patent 2,253,589, August 26, 1944).

The invention relates in general to and has among its objects the provision of methods and means for measuring angles of bearing, linear displacements and velocities of distant objects. It makes use primarily of radio waves of ultra-high frequency, and preferably such waves as may be readily radiated or received by horns of reasonable dimensions. The invention is applicable to the case (a) where the object on which observations are being taken is itself a source of such waves, and (b) where the object may be "illuminated" by a radio field and information about its position deduced from the reflected signal.

The foregoing methods and means are disclosed in the following specification and the accompanying drawings, in which.

Figure 16:
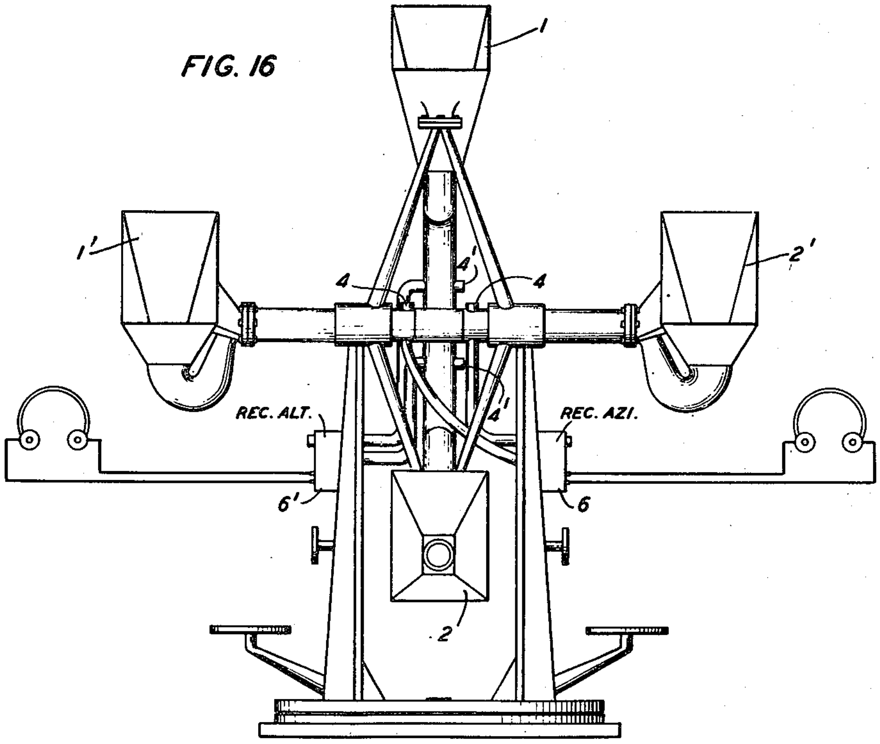
Figure 17:
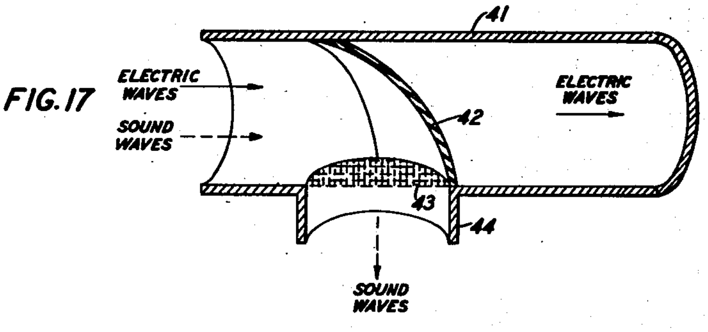

Figs. 6 to 11 relate to a pair of horns or other transducers one of which is a transmitter and one a receiver;

Figs. 12 to 15 relate to combinations of arrangements of Figs. 2 to 11;

Fig. 16 shows four horns mounted on alti-azimuth axes;

Fig. 17 relates to a combination of acoustic and electromagnetic location of bodies; and Figs. 18 to 23 relate to arrangements for determination of distance to as well as direction and velocity of a remote object.

It is a well-known principle of wave motion that if two streams of wave power of the same frequency and approximately the same amplitude fall on the same receiver, they will produce a resultant signal equal to the vector sum of the two impressed components. Special cases are the sums and differences of the two component amplitudes. It is proposed to make use of this general principle as applied to radio waves for measuring the quantities referred to above. In the case at hand and for illustrative purposes, it will be convenient to think in terms of wave-lengths of, say, 10 centimeters (3,000 megacycles) to measure displacements of hundreds of meters.

There is one case of wave interference that is of particular interest herein. This is the case where two oppositely-directed wave trains of approximately the same amplitude and frequency meet in space. The result at any given instant is the vector sum of the two components involved. Carrying this consideration to all points in space, there are various interesting results. In particular, if the two components are identical in amplitude and frequency, the result is a so-called standing wave. If the two components are identical in frequency but are different in amplitude, the result is a standing wave plus a moving or progressive wave the velocity of which is equal to the respective velocities of the individual components. A simple way to produce oppositely-directed trains of waves of the same frequency and roughly of the same amplitude is to reflect such a train back into itself.

If the two trains are of the same amplitude but slightly different frequency, there is produced, among other things, a standing wave having a slight progressive movement. These may be called creeping waves. Their velocity depends on the difference in the two frequencies and is in the direction of the higher frequency component. It may be represented by $$V = \pm \frac{\Delta f}{f} c$$

where $c$ is the velocity of the two component waves. A simple way to generate creeping waves is to reflect a train of waves into itself as before, but this time we move a mirror continuously toward or away from the source. In one case the reflected waves are shorter and in the other longer than the incident waves. This results in an apparent change in frequency. If $v$ is the radial velocity of the reflector with respect to the receiver, then $$\Delta f = \pm \frac{2v}{c} f$$

Substituting this in the equation immediately above, we find that $V=2v$. In other words, creeping waves may be generated that travel with a velocity twice that of the reflecting object. If the two components differ in amplitude as well as in frequency, there will be two kinds of progressive waves. It should be noted that there are other means of producing creeping waves than by reflection. One example is given in my U. S. Patent 2,141,282, December 27, 1938, which patent contains a complete mathematical theory of creeping and standing waves.

Interpreting the above results in terms of very moderate velocities, such as a person walking, one would expect to observe a mere flutter as the interference fringes pass the receiver. If, however, the object is an airplane in flight, the situation is different. Airplane velocities of 10,000 centimeters per second (=227 miles per hour) are not uncommon. For a 10-centimeter wave where $f=3\times10^9$, this case leads to $\Delta f=2{,}000$ cycles. For airplane velocities of 1,000 centimeters per second, this frequency shift would be 200 cycles. Thus one observes that for many of the velocities of interest in practice the frequency shift is in the audio range. Use will be made of this fact in the arrangements to be disclosed below.

Still another particular case of wave interference results when a carrier wave having a frequency $f_0$ is modulated with a frequency $f_1$. There will result in space several waves of which the components $f_0+f_1$ and $f_0-f_1$ are of particular interest. The difference in these two components is $\Delta f=2f_1$ and the two components may be thought of as giving rise to a kind of creeping wave. Modulation thus makes it possible to divide an advancing wave into various decimal parts as may be needed in measurement. A more complete theory and also a proposal for using modulated waves for measurement work is given in my U. S. Patent 2,141,281, December 27, 1938.

These principles of interference apply not only for free space as described above, but they apply equally well to wave guides. They may also be applied to a composite system involving both free space waves and waves in guides. For such a system to work best, however, there should be a good match between the wave guide system and the external medium so that no substantial reflection takes place at the point of contact. Also throughout the whole system precautions for impedance matching should be observed. Suitable conditions for such matching in the case of free space, horns, and wave guide sections is set forth in my copending application, Serial No. 346,175, filed July 18, 1940.

My method of measuring the bearing of a distant object depends on a determination of the direction of arrival of electromagnetic waves from that object. If the object is an emitter of waves, a directional receiver is sufficient. Otherwise a transmitter must be available to provide the necessary wave power for illuminating the object.

Figure 1:
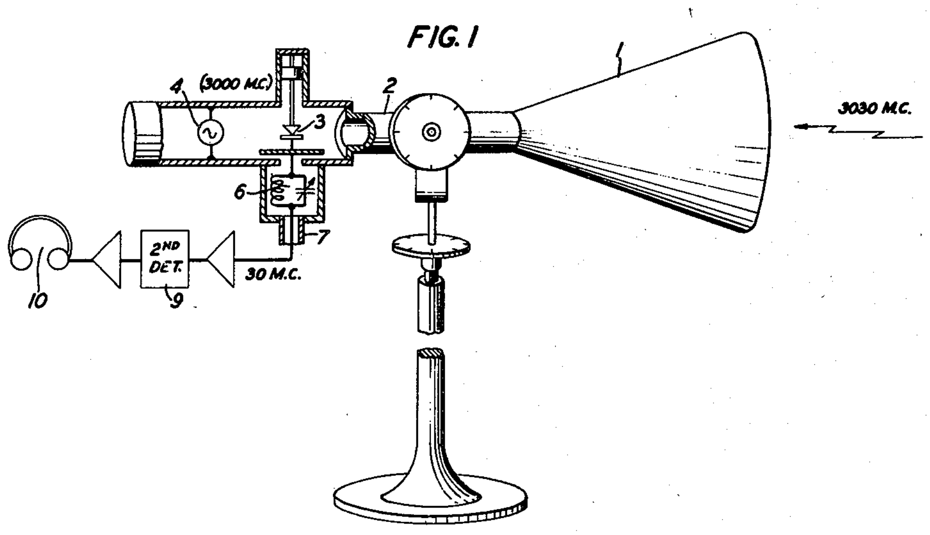
Fig. 1 represents a directional horn and appropriate circuits for receiving primary or reflected waves from a remote object.

A simple receiver suitable for measuring the direction of arrival of 10-centimeter signals is shown in Fig. 1. It consists of an electromagnetic horn 1, a wave guide section 2, a tuned crystal detector 3, a suitable audio amplifier and headphones or other indicator. Such an arrangement assumes that the received waves are distinguishable by some convenient audio modulation. All of the apparatus is mounted on suitable axes so that the horn may be pointed in the direction of the arriving signals. Suitable protractors would permit the angular bearings to be read.

The specific arrangement of Fig. 1 goes further than the description above in that double demodulation is used. A representative example would be the reception of 3,030-megacycle signals. A beating oscillator 4, set for 3,000 megacycles is enclosed in a resonant chamber together with the demodulator crystal 3, which latter is tuned for 3,030 megacycles. The throat leading from the horn 1 to the chamber is made of such a diameter as to admit the wanted signal but to reject the transmission of the beating oscillator power to the exterior. This makes for more economical use of this power. The internal diameter of a connecting tube suitable for the above two frequencies would be 5.82 centimeters. Instead of a simple constriction such as shown in the figure one may insert a suitable filter of the general form disclosed in my Patent 2,106,768, February 1, 1938. The demodulator unit shown herein comprises the tuned circuit 6 which is associated with a section of coaxial cable 7, all adapted to transmit the difference frequency of 30 megacycles. After suitable amplification and second detection at 9, the circuit is shown as leading to head-phones or other indicator 10. Obviously, a variety of different forms of detectors could be used and many forms of oscillators to provide the beating frequency are available. Such oscillators, for example, are described in the copending application of A. E. Bowen, Serial No. 223,426, filed August 6, 1938 (Patent No. 2,253,503, August 26, 1941).

If the object whose bearing is to be taken is not a primary radiator, it will be necessary to illuminate it with radiation of 3,030 megacycles. Here again any suitable form of radiator may be used. One very suitable form would be such a one as the beating oscillator above and it could be connected through a short length of wave guide to any suitable radiator such as an electromagnetic horn. In this case the horn performs two functions: (1) it enhances the signal projected in the direction of the object and (2) it minimizes the signal interference that it might otherwise produce with neighboring receivers. Furthermore, as an illuminator it is contemplated that instead of a single horn there may be an array of horns having high directivity, such as described in my copending application last mentioned above.

Figure 2:
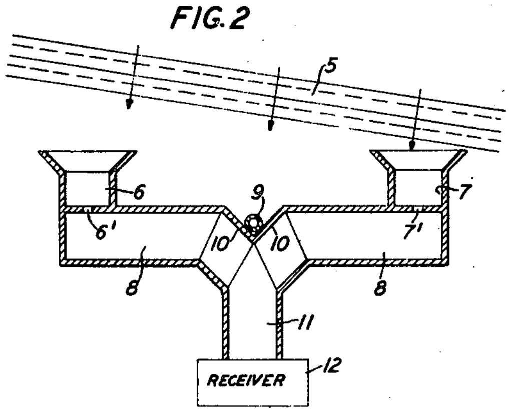
Figs. 2 to 5 show combinations of two horns by which a binaural or quasi-binaural effect is obtained.

Definition is, of course, a very desirable feature in a direction finder. Although the form of direction finder shown in Fig. 1 is in itself quite excellent, this definition may be improved by using two horns feeding into the same receiver, as shown in Figs. 2 to 6. Referring particularly to Fig. 2, there is shown a direction finder. Two unit tubular guides 6 and 7, each a cavity type resonator, are shown on the ends of transverse guides 8 which are pivotally mounted so as to rotate about a vertical axis at 9. The received radiation in the guide units 6 and 7 is admitted by the windows 6′ and 7′ to the transverse guides. By means of the reflectors 10 the radiation is directed into the main guide 11 and thence to the receiver 12.

The crests and troughs of an approaching wave to be received are represented by the continuous and the dotted lines at 5. If the apparatus is turned so as to be directed accurately to receive these waves, the effects in the two resonators will be in like phase and there will be a maximum of received intensity in the receiver 12.

Figure 3:
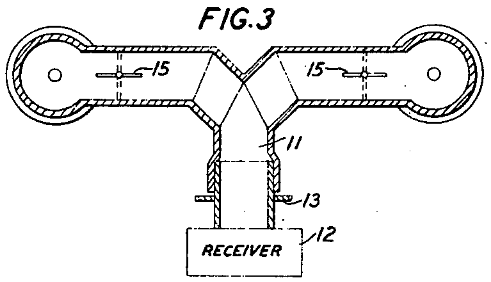

A modification is shown in Fig. 3 in which the two resonating chambers connect with the vertical main guide 11 which has a joint so that the receiver 12 can remain stationary while the rest of the device rotates and the angle read off on a scale at 13.

In either of the forms of Figs. 2 and 3 there will be several maxima and minima of intensity corresponding to a difference of wave path of an integral number of half wave-lengths. Generally the intensity in the receiver will be less than when this difference is zero. However, to be certain that the maximum intensity depended upon corresponds to zero difference in wave path, one of the chambers is shut off by a butterfly valve, such as 15, and the device is rotated through a wide angle to get the direction of maximum intensity with a tolerable degree of approximation. Then the valve 15 is opened and final adjustments are made about the position previously ascertained to get the direction more exactly. Two valves 15 are provided, one on each side, as shown in Fig. 3, so that the elecrtcial paths on the two sides will be matched and balanced.

Figure 4:
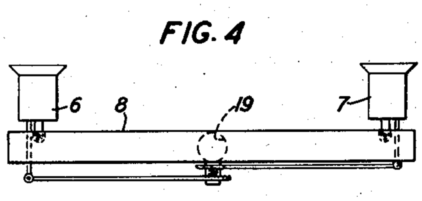
Figure 5:
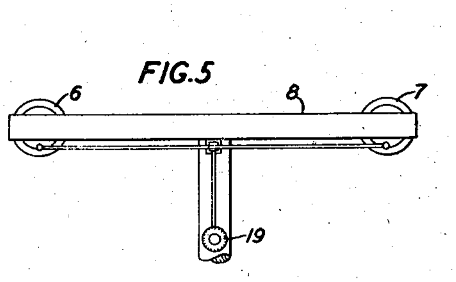

A range finder is shown in plan view in Fig. 4 and in elevation in Fig. 5. The two resonant chambers 6 and 7 are pivoted on the cross-member 8. In the condition shown in the figure an axis of each chamber 6 and 7 will be at 90 degrees to the cross-arm 8. By turning the knob 19 at the scale the interposed mechanism operates to incline the chambers 6 and 7 a little so that these angles become less than 90 degrees. The approaching wave front will be circular and will be received with greatest intensity when the axes of the two resonating chambers are directed along respective radii of such circuits. The scale at the knob 19 may be calibrated to read the range directly.

Figure 6:
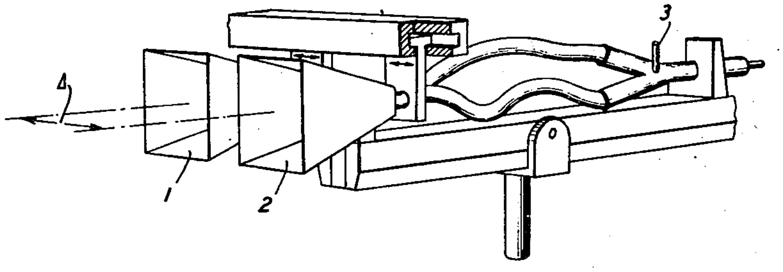

Fig. 6 shows a form of direction finder comprising two identical horns 1 and 2 of rectangular cross-section which feed through flexible tubing to the common receiver 3. I find that when the horns are contiguous the definition is only moderately good. As the horns are progressively separated this definition improves remarkably. For this reason provision is made whereby the separation between the two horns may be altered as shown in the figure. However, there may be some confusion due to the development of secondary maxima. In practice one would make the first observations with the two horns immediately adjacent and after the direction of the remote object has been determined approximately the horns should be separated progressively, each time with appropriate corrections in orientation. Such a progressive approach to the final correct angle avoids possible error due to the observer not being able to distinguish readily between the primary maximum and the secondary maxima.

It is possible to locate the illuminator either adjacent to the receiver or at some distance. However, it is important that it be so arranged that most of the radiation reaching the receiver shall arrive by way of the object. Convenience dictates that the illuminator be as close to the receiver as conditions of interference will permit and the high directive discrimination of horns or arrays of horns permits a close spacing of these two elements. In fact, I find it feasible to mount the two in a parallel position on the opposite ends of a horizontal cross-bar as shown in Fig. 7 and the two horns or arrays of horns may then be pointed simultaneously in the same direction to illuminate a distant object and to receive its reflected signal.

There may be circumstances where the leakage from the illuminator into the local receiver is too great for good operation. It is possible to compensate for this leakage by providing a second path into the receiver over which a controlled level of wave power may be fed in a phase opposite to the first. Means for bringing this about are shown in Figs. 7 to 11. The process of compensation may be carried out in various degrees of refinement as dictated by circumstances. Fig. 7 shows a very simple arrangement that is sufficient for many purposes. It makes use of the special reflecting powers of a grating 11 of parallel conductors. When such a grating is arranged with its conductors parallel to the lines of electric force of an advancing wave, it becomes an excellent reflector, but when perpendicular to these lines of force it is a very poor reflector. At intermediate angles it is more or less a good reflector, depending upon the angle between the conductors and the lines of electric force. Here the parallel grating is shown mounted on the end of the rod 12 occupying a position between the two horns. The phase of the return compensated wave is controlled by the distance measured from the mouth of the horns to the plane of the grating. This may be varied by sliding the rod longitudinally. The amplitude of the signal is controlled by the angle between the lines of electric force and the conductors, this rotation being indicated on the figure. These are not, however, altogether independent variables.

Figure 7:
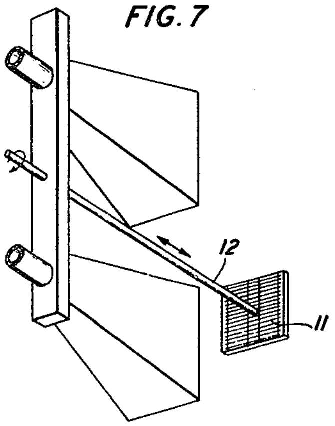
Figure 8:
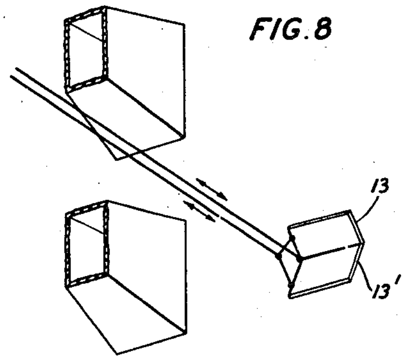

Fig. 8 shows a second form of compensation. Like the one already shown, it operates on the free space in front of the two horns. As in Fig. 7, the proper phase relations are determined by a spacing of the reflector element from the mouths of the two horns. The reflector consists of two intersecting planes of sheet metal 13 and 13' and by altering the angle between the two planes more or less wave power is diverted from the transmitter to the receiver.

Figure 9:
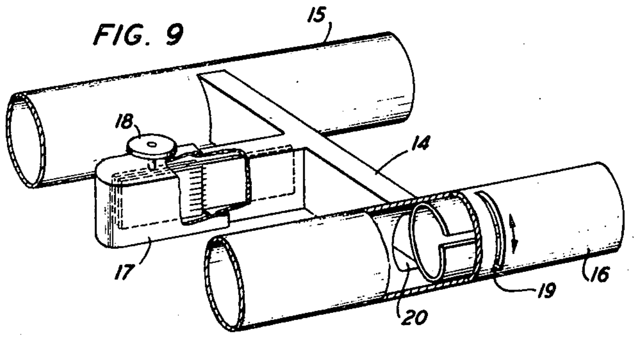
Figure 10:
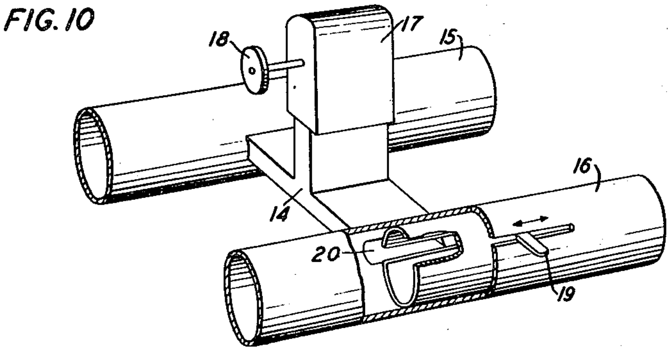

Fig. 9 shows a third method of compensation differing from the Figs. 7 and 8 in that it operates solely by wave guide methods. Two cases are shown to fit two possible cases of polarization of transverse electric waves. A rectangular guide 14 connects the transmitter pipe 15 with the receiver pipe 16, thereby providing the necessary compensation. The effective electrical length of this cross-connection is made variable by a trombone section 17 actuated by a handwheel 18 connected to a rack and pinion. The length of this section controls the phase of the wave transmitted from pipe 15 to pipe 16. In each of these pipes there is suitable amplitude control 19 for varying the magnitude of the wave power fed from the one pipe to the other. A narrow slit 20 connects the two devices. The width of this slit is made variable by a rotational displacement of a thin spring-pressed sleeve, the end of this sleeve being slightly spiral inside the circular pipe. The pitch of the spiral is such that moderately large displacements of the sleeve correspond to relatively small changes in the slit width. The arrangement of Fig. 10 is substantially the same as that of Fig. 9, but is designed for waves in which the plane of polarization of the electric vector is at right angles to that present in the device of Fig. 9. In this case the sleeve has a slit that is not strictly longitudinal and the sleeve is arranged for longitudinal displacement.

The arrangements of Figs. 9 and 10 for controlling the amount of power fed from one tube to another are useful in connection with the devices described herein, but it is evident that there are other useful applications in systems involving dielectric guide waves. For example, they could be used in controlling the amount of feedback in ultra-short wave amplifiers and in oscillation generators.

Figure 11:
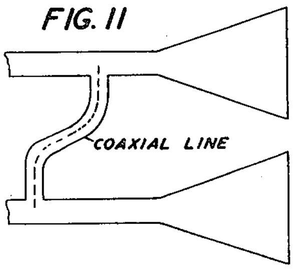

Fig. 11 shows an alternative form for obtaining controlled transfer of power from the one pipe to the other, the connection between the two in this case being a section of coaxial line rather than a pure wave guide section.

Figure 13:
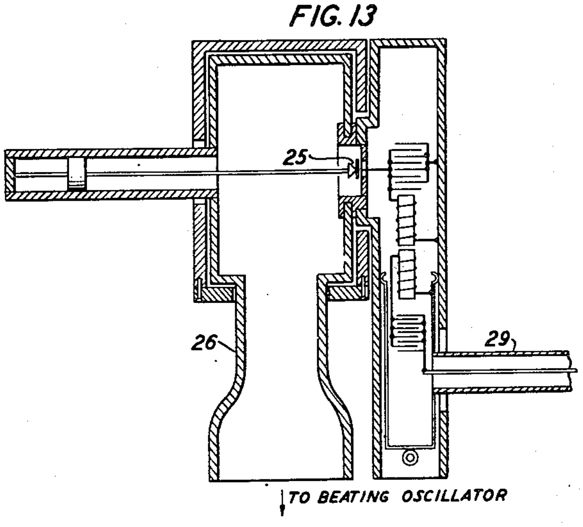
Figure 12:
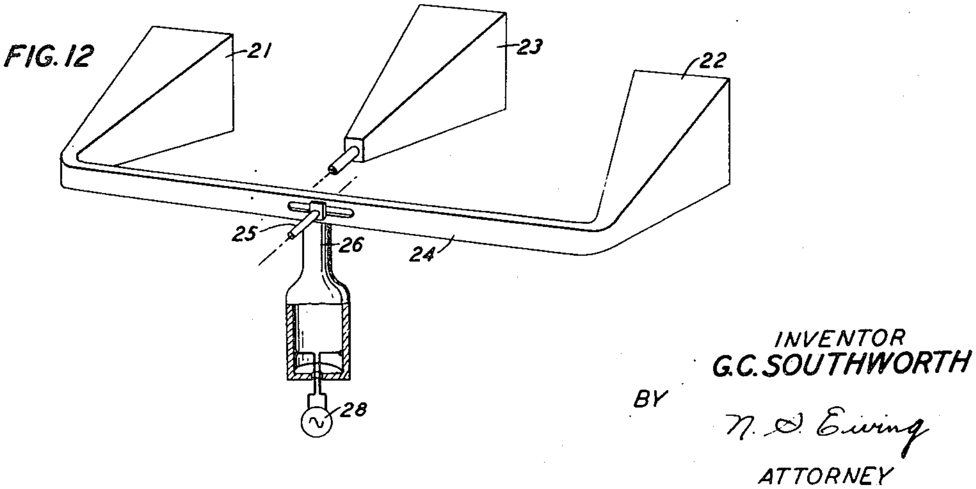

Fig. 12 shows a direction finder with two receiving horns 21 and 22 combined with a directive illuminator 23. Here the receiving horns are of identical rectangular cross-section which for 10-centimeter waves could appropriately have dimensions at the mouth of 37.0 centimeters and 45.4 centimeters with a length of at least 50 centimeters. The two horns are shown as connected by a rectangular wave guide 24, the dimensions being such that the system is electrically smooth throughout in accordance with principles described in my copending application Serial No. 346,175 filed July 18, 1940. There is located in the wave guide and connected to both horns a first demodulator 25 of the type described in connection with Fig. 1. This is so constructed that it may slide along the wave guide to take up a position where the signals from the two horns are in the same phase or in opposite phase, depending upon whether the device is to be operated in accordance with a null method or a maximum method. Details of one form which the detector may take is shown in Fig. 13. In that figure it will be observed that a section holding the first detector 25 telescopes inside of the wave guide and is free to move somewhat more than a half wave-length as measured in the guide. This permits setting the receiver at any representative point between a maximum and a minimum. The inside breadth of this movable section is made such as to barely admit the wanted signal of 3,000 megacycles. Connected to this demodulator unit through the pipe 26 is the beating oscillator 28. This latter may be set at 2,970 megacycles. It will be observed that while the beating oscillator power may be impressed on the demodulator, it cannot escape to the horns because of the restricted breadth of the movable section of wave guide. The demodulated power of 30 megacycles is carried away through a coaxial conductor 29 and may be amplified in the usual way.

If an illuminator 23 is to be used in connection with this device it may well be located on the cross-bar connecting the two horns. It should preferably be placed a quarter wave off the midway position. Then it will be located a half wave closer to one horn than to the other and the leakage compensation will be sufficient for most practical purposes. In addition, it is evident, of course, that an adjustable compensation of the kind described in connection with Figs. 9 and 10 may be used.

The principal of binaural reception by which the direction of arrival of sound waves may be detected very simply and very accurately is well known. It is considered to depend on the difference in time of arrival of sound at the two ears. At first sight it would appear that this principle could not be applied to radio waves, at least with apparatus of any convenient dimensions, for on account of the high velocity of radio waves it would not be possible to obtain sufficiently large time intervals for binaural observation. This, however, I find is not altogether true for it is possible to produce results that are quite like the binaural effect as will now be described.

Figure 14:
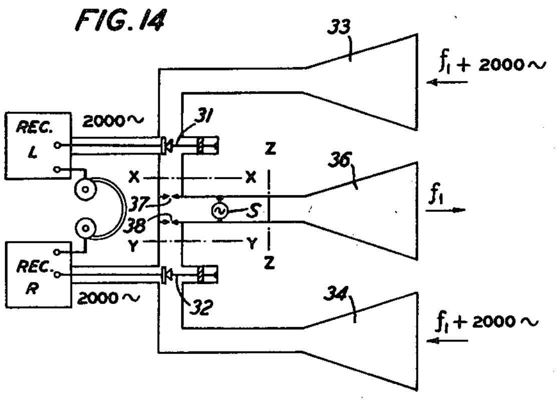

One form of the apparatus suitable for the purpose is shown schematically in Fig. 14. It is a simple modification of Fig. 12 in which the one receiver there shown is replaced by two similar receivers 31 and 32 connected respectively to the horns 33 and 34. Their respective outputs are amplified to the same level and connected to independent telephones placed at the two ears of the observer. This alone is not sufficient for the binaural effect. It is necessary to have some type of wave configuration that will produce audible sound and will lead to a sensible time interval as the apparatus is varied from the direction of arrival of the on-coming radio waves. Such a time interval can be obtained through the properties of creeping waves referred to heretofore. We may assume for present purposes that the object is an airplane moving toward the observer with a velocity of 100 meters per second. If radio waves are projected toward the plane the reflected component will have its frequency higher than the outgoing waves. The result will be a series of nodes and loops moving toward the observer with a velocity of 200 meters per second. For a carrier wave of 3,000 megacycles the returned frequency increase is 2,000 cycles.

The apparatus of Fig. 14 accomplishes this result by projecting from the horn 36 a radio frequency of, say 3,000 megacycles. This component is reflected, as already assumed, to produce a new frequency of 3,000 megacycles plus 2,000 cycles. This latter is picked up by the horns 33 and 34 and is fed into the two similar receivers 31 and 32 along with a small component of the original wave that has been allowed to leak through the irises 37 and 38. There is then present in the two pipes in which the receivers are located advancing standing waves moving with a velocity roughly that of sound in free space. Immediately outside the horns a similar situation exists with the result that a slight rotation of the apparatus relative to the advancing waves gives rise to a sensible time delay at one ear relative to the other, thus giving rise to a binaural effect.

By placing a shielding separator between the two receiving horns of Fig. 14 in such a way that when the apparatus is turned at an angle with the advancing wave, one horn will pick up sensibly more power than the other, this will enable one to employ the relative loudness effect at the two receivers as well as more usual binaural effect.

Figure 15:
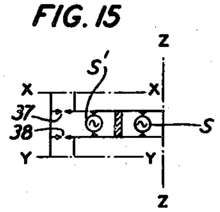

The binaural effect described depends for its operation on the distance object being in motion. It would be desirable to apply this principle to a stationary object also and this, I find, can be obtained by projecting in the direction of the distant object a frequency 2,000 or 3,000 cycles higher than that fed through the irises into the two receivers. This modification is shown in Fig. 15 which contains two appropriately separated sources S and S′, the latter of which provides a beating oscillator frequency in a manner analogous to that described in connection with previous figures.

The forms of direction finder shown in Figs. 12 and 14 are applicable to angles of azimuth only. In some circumstances, as for example, in the location of airplanes, it will be desirable to orient the horns in all directions. Fig. 16 shows a suitable mechanism for this purpose, it being obviously patterned after so-called sound locators. Actually I find that the horns used in sound locators have a taper which is reasonably appropriate for electromagnetic waves of frequencies of 3,000 megacycles and by modification of such sound locators they may be quite readily adapted for the purposes described. In this Fig. 16 it is assumed that a simple channel of radio waves is used. Each of the pair of horns 1, 2, and 1′, 2′ connects to its own pair of detectors 4 and 4′ as already described in connection with Fig. 14, the outputs of these pairs of detectors leading respectively, to the amplifier and output units 6 and 6′ mounted respectively, in front of the altitude operator and the azimuth operator in accordance with the description given in connection with Fig. 14.

It is possible to use the equipment of Fig. 16 to operate the horns both electrically and acoustically to be used separately for the one or the other, or to be used simultaneously for both methods of location. In this event certain modifications are necessary. Near the intersection of the azimuth and the altitude axes a branch is located constructed in accordance with Fig. 17. It is a special tee 41 containing a barrier 42 made of some good insulating material. This is transparent to electric waves but offers a definite barrier to acoustic waves. To the right of this barrier we may have electric waves but no acoustic waves. At 43 where the side tube takes off there is introduced a fine mesh metal screen. This is transparent to acoustic waves but is opaque to electric waves and thus a complete separation of the two types of signal waves is obtained. If the diameter of the branch 44 is made too small to propagate electric waves there will be no need for the metal gauze. The various parts of the tee are so proportioned and fared that they offer no substantial discontinuity to the respective waves to be propagated. This concept of using a horn or a wave guide for both electric and acoustic waves and at some point in the line separating by appropriate filters constitutes one substantial feature of my invention. It is evident that it has many other applications than that specifically described herein.

Figure 18:
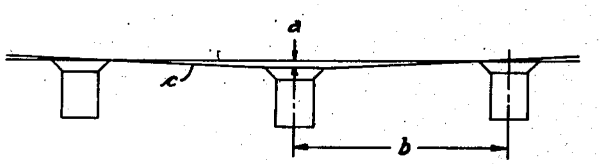

In a modified form of range finder of Fig. 18 three receiving chambers are employed and the middle one is adjusted forward or backward to get a maximum intensity when all three such chambers are combined. At this intensity the three receivers will be equidistant from the source. With the source as center an arc $c$ is drawn with $b$ as its half cord. The sagitta of the arc $c$ is the length $a$ and the range is a function of $a$ in relation to $b$ so that from the adjustment of the middle receiver the range $d$ can be ascertained. The formula is $$d=\frac{b^2}{2a}$$

If the wave-length is 10 centimeters, the displacement of the middle receiver between maximum and minimum intensity would be 5 centimeters. This means that it would be easy to detect signal differences corresponding to sagittal differences as small as one centimeter. If the wave-length is reduced to one centimeter, the displacement of the receiver between maximum and minimum intensity would be 0.5 centimeter and if the base is 3 meters, then by substitution of the above formula we get a distance to the source of 4,500 meters.

Figure 19:
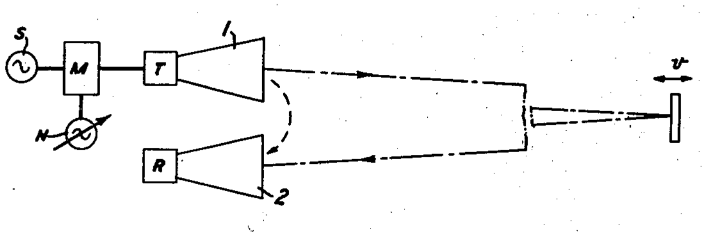

In Fig. 19 there is shown another adaptation of the invention to a system for determining the angular bearing as well as the distance to the remote object. Here the horn 1 is used as a transmitter and the horn 2 as a receiver, both of fairly high directivity. A source S of ultra-high frequency, say 3,000 megacycles, is modulated in a modulator M from a signal source N. The output of the modulator M is then impressed on the launching device T for radiation through the horn 1. The transmitting and receiving units may be mounted on a rotatable cross-bar in a manner similar to that contemplated in Figs. 7 and 8. As the transmitter and receiver are moved to scan the field a position will be reached where the waves reflected from the remote object will be directed along the axis of the receiving horn so as to affect the receiving apparatus R. If the remote object is stationary then the presence of the received wave may be detected by virtue of the modulating frequency from M.

To determine other information about the object besides its presence and bearing, a direct wave path is established between the transmitter and receiver for comparison purposes. This may comprise the natural leakage from one horn to the other as illustrated or may be a coaxial line such as that shown in Fig. 11 and of such form that the amount and phase of power thus delivered from the transmitter to the receiver would be controlled. In any case the local path provides in the receiver R a reference wave which may be used for comparison with the received reflected wave in the manner already described in connection with previous figures. If the object is moved toward or away from the detecting apparatus a flutter or cyclical variation in the intensity of the tone in the telephone receiver will be noted. If the receiving apparatus is given an acceleration toward the object and the frequency of the flutter increases, it may be concluded that the object is moving toward the apparatus, which will be verified if the flutter frequency is reduced when the apparatus is accelerated in the other direction. If upon accelerating the apparatus toward the object it is found that the frequency of flutter first decreases, then increases, it may be concluded that the object is receding and that the velocity of the apparatus at which the flutter frequency is zero is the speed of the object. It is obvious that a reversal of this procedure will determine the speed of objects moving in the opposite direction.

For determining the distance from the locator to the object it is desirable that the modulating frequency be adjusted. If then the transmitting wave is modulated with a frequency corresponding to a free space wave-length equal to four times the distance to the object, interference with the local signal in the receiver will be complete and the modulating frequency is then a measure of the distance to the object. For the purpose of measuring this distance the modulating frequency should be the lowest for which complete interference is obtained.

It has already been explained that the reflected wave from an obstacle gives rise to a standing wave when combined with the outgoing wave and that the displacement of the object by a quarter wave-length corresponds to a half wave change in the interference pattern. If the object, moving toward the observing station, encounters on the way $n$ half waves per second there would be $2n$ nodes (or loops) per second evident at the receiver, giving rise to a corresponding frequency change $$\Delta f=\frac{2v}{c}f$$

Thus it is seen that the half wave time intervals arriving at the receiver are effectively division marks of the space interval between the locator and the distant object. For a wave-length of 10 centimeters these divisions appear at intervals of 5 centimeters. These may be too short for certain practical purposes, in which event it is necessary only to modulate the carrier wave with a lower frequency of, say 300 megacycles ($\lambda$=1.0 meter) and there is then superposed on the small intervals other space intervals ten times as great. One may then go further and modulate with 30 megacycles ($\lambda=10$ meters), then even 3 megacycles ($\lambda=100$ meters) and obtain respectively, 100 full intervals or 1,000 full intervals, as may be needed. Thus this method provides a decimal system or other convenient system for measuring either distances or velocities.

In the system as thus described provision is not made for reading the total distance out to the object. That is to say, the index of the scale may not in all cases be located at the observing apparatus. There are, however, cases where this kind of measurement is unnecessary. For instance, one may be interested in the displacement of some distant object from some arbitrary position of reference. For this purpose it is necessary only to count up the total number of distance units of each arbitrary denomination as the object leaves the reference point. Velocity would be determined by measuring the number of its distance units covered per unit of time. In some instances this latter would be indicated by a tone of a certain pitch corresponding to the number of interference fringes intercepted per unit of time.

An example of application of this method would be the measurement of the distance out to an airplane as it leaves a landing field on a straightaway journey. If one counts up the total number of fringes registered at the receiver as the plane leaves port one will have the total distance to the plane regardless of deviations it may take in its course. Another example of application would be measurement taken at the airplane itself of the distance units to ground. In the latter case the earth is the reflector for waves sent out and received on board the plane. In both of these cases it will be important to know whether the fringes have resulted from an increase or a decrease of distance between object and locator. This aspect of my invention will be discussed below. Suitable circuit arrangements for counting the number of maxima or minima in space are described in my U. S. Patent 2,141,281 referred to above. Methods for reckoning the approximate distance out to an object in terms of the echo time of a radio signal are well known. Such a method is suitable for use in conjunction with the more exact interference method here proposed and is convenient where total distance is needed as well as displacement which the distant object may make.

Figure 20:
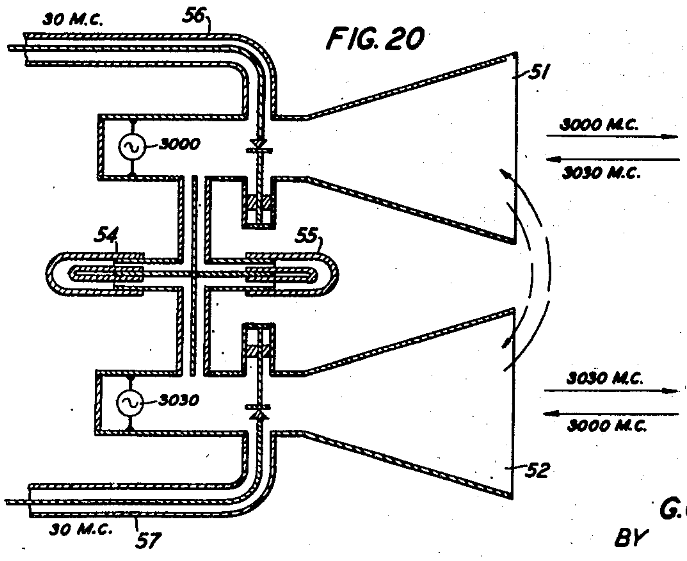

Fig. 20 is a variation of the method of Fig. 19 in that two transmitters and two receivers are used simultaneously, making use of two horns only. In this form the wave power from each oscillator not used for beating purposes is projected outward toward the distant object and back into the opposite horn as a receiver where it is demodulated down to an intermediate frequency. For the purposes at hand it is appropriate to assume frequencies of 3,000 megacycles, radiated from horn 51 and received at horn 52 both by leakage and by reflection at the remote obstacle, and of 3,030 megacycles radiated from the horn 52 and similarly received in the horn 51. This gives in each receiver a beat frequency of 30 megacycles. A compensating leak path is provided from each oscillator to the opposite receiver, the compensating paths being of the general form described in connection with Figs. 9 and 10. Two such paths 54 and 55 are shown, one for each channel. In general the guides 56 and 57 would be so designed as to transmit frequencies of the order of 30 megacycles only by means such as shown in Fig. 13.

At first sight it might appear that there would be no advantage in transmitting two frequencies simultaneously as shown in Fig. 20. I find, however, that there are several advantages incidental to this method. For example, it will be seen that there exists in the space between the locator and the distant object a special kind of wave interference such that as the object moves there will appear at each receiver not only the 5-centimeter interval of interference already referred to, but also a 5-meter interval corresponding to the 30-megacycle beat frequency. In addition, it will be noted that in the space from the transmitter to the reflector and back to the receiver there are two oppositely directed trains of waves differing in frequency by 30 megacycles. This means that in this space there is a traveling wave whose apparent length is 10 meters and whose apparent velocity is $$\frac{f_1-f_2}{f}c$$

which for the case assumed is $3\times10^{-8}$ centimeters per second. This component appears in the controlled leakage as well as in the reflected component, so that the receiver appears to be receiving a 10-meter wave in addition to a 10-centimeter wave.

In addition to this group effect which comes by virtue of transmitting two frequencies, there is another advantage that is of importance when the velocity of the distant object is to be measured. If but one wave frequency were used the apparent frequency shift experienced at the receiver due to the velocity of the reflector would be $$\Delta f=\pm\frac{2v}{c}f$$

If, however, we transmit two nearby frequencies, as assumed above, there will be a frequency shift of approximately $$\Delta f=\pm\frac{4v}{c}f$$

This improves the sensitivity of the method by a factor of 2.

Referring again to the transmission of two frequencies as in Fig. 20 it will be seen that there are present two 30-megacycle outputs at the receivers. Each will have resulted from beating together 3,000 megacycles and 3,030 megacycles. They differ, however, in one important respect. In one case it is the 3,000-megacycle wave that bears the characteristic of the reflecting body whereas in the other it is the 3,030 megacycle wave. It is possible to connect these two outputs either in series or in parallel and we may so arrange their relative phases that the characteristics of the distant object as viewed in the two channels may add or tend to cancel. If the latter condition is chosen, then the resultant will contain only the components by which the two channels differ.

An obvious variation of the arrangement of Fig. 20 is that of having four horns, two serving as transmitters and two as receivers, thus providing two channels which would be supplied with independent receivers and transmitters and each with provision for control of the necessary beating oscillator power and leaks. Furthermore, in this case as well as in all others discussed it is understood that any horn may be replaced by an array of horns wherever desired.

The mechanical and electrical composite of Fig. 20 and of other figures may be so adjusted or balanced that a null or a fixed signal is present for a substantially stationary reflecting scene but the insertion in the field of view of a new object, such as a moving train of trucks, would immediately be indicated.

Figure 21:
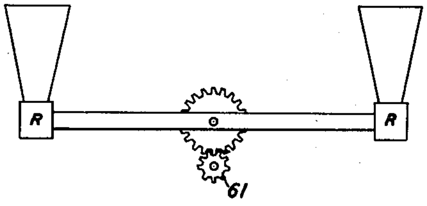

When it is necessary to know the direction of the displacement of the distant object, toward or away from the observer, as well as its magnitude, certain modifications of the principles described above may be introduced. For instance, one may rotate or spin a two-horn receiver of the type shown in Figs. 2 to 5. One convenient method of doing this is shown in Fig. 21. If the two-horn combination is being rotated continuously by motor drive 61 or otherwise, one horn will on the average be moving toward the object and the other away. The outputs from the two horns may be brought along their respective horizontal members and down a vertical axis through independent pipes with a suitable commutating device. In the one side of the pipes following the commutator there will be maxima at more closely spaced intervals than in the other, depending upon whether or not the object is moving toward the observing station.

Figure 22:
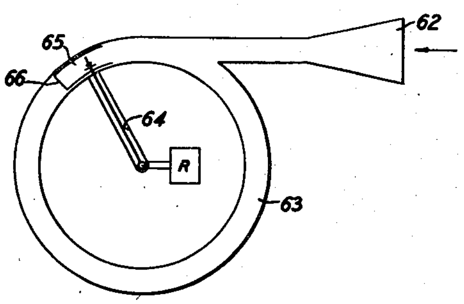

In still another mechanical method a single stationary horn is used as shown in Fig. 22, thereby overcoming some of the mechanical difficulties encountered with a rotating system such as that of Fig. 21. In Fig. 22 the horn 22 is connected to a pipe 63 of rectangular cross-section bent into a circle. A rotating arm 64 carries at its end a crystal conductor and a tuned chamber 65 comprising reflector plate 66, all connected in the usual way to receiving apparatus indicated at R. The arm 64 may be rotated either clockwise or counter-clockwise as may be necessary to obtain the results already discussed.

Figure 23:
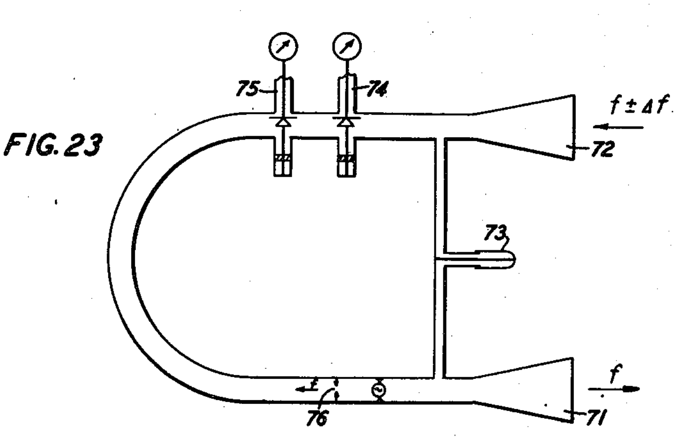

It is possible to determine the sense of motion by a method which is altogether electrical in nature and consequently requires no moving parts. This is illustrated in Fig. 23 in a highly schematic form. It is assumed that radio waves having a frequency $f$ are projected from the horn 71 and reflected from the distant object and returned to the horn 72 at a frequency $f \pm \Delta f$. Leakage is compensated to the desired amount by the phase device 73 of a form already described. The returned waves are impressed on two receivers 74 and 75 which are so spaced in the wave guide as to represent an appreciable phase difference as regards the creeping wave. In terms of the carrier frequency $f$ this spacing is substantially, though not exactly, an integral number of wave-lengths. The electrical distance from these receivers around to the iris 76, which functions in part as a reflector, is such as to approximately match both receivers at this frequency. The iris also permits waves of frequency $f$ to pass, in part, from the oscillator side into the receiver side. There will then be impressed on the two receivers two frequencies, one corresponding to a wave moving to the right having a frequency $f$ and the other a wave moving to the left having a frequency $f \pm \Delta f$. These will be recognized as the necessary conditions for creeping waves. If the wave being received is due to reflection from an airplane moving toward the observing station with a velocity of say 100 meters per second (227 miles per hour), the arriving wave will have an apparent frequency higher than that being transmitted. For the 3,000-megacycle waves assumed this will be 2,000 cycles. The phase velocity of the creeping wave in the pipe will be $$v = \frac{\Delta f}{f} V_g$$

where $V_g$ is the phase velocity in the guide. As a special illustration, if $V_g = 1.5$ c. then $$\frac{v}{V_g} = \frac{\Delta f}{f} = \frac{2000}{3 \times 10^9} = 6.67 \times 10^{-7}$$

whence $v = 30{,}000$ centimeters per second. It will be observed that this is comparable with the velocity of sound. One could very readily proportion the guiding structure so that the resulting velocity would be exactly that of sound, if that should be desired.

Expressing these results in terms of Fig. 23, it will be observed that creeping standing waves of approximately 10 centimeters free space wavelength are moving from left to right in the upper pipe with a velocity of 30,000 centimeters per second. They register first at receiver 74 and then a fraction of a second later at receiver 75. If the distant object were moving in the opposite direction this phase relation would be reversed. It is necessary, therefore, only to determine the relative phase at the two receivers with respect to the moving wave to determine the sense of direction of the moving object. There are many ways of accomplishing this result.

Thus suppose that the distant object is moving very slowly toward the observing apparatus and that the two receivers are connected to output meters as indicated in Fig. 23. In that case the meter at 74 will deflect in advance of that at 75 and phase difference may be detected visually.

Suppose next that the distant object is moving with a velocity of 100 meters per second, thereby causing maxima to cross each receiver at the rate of 2,000 per second. If a single earphone be attached to each receiver and one listens by holding a receiver to each ear, then by the well-known principle of the binaural effect it is possible to observe phase difference very simply and very accurately. There are a number of ways by which the phase or time difference may be determined by electrical means. For example, by suitable compensating or delay networks in the circuits it is possible to detect directly the velocity of the creeping wave, which information may then be applied for detailed information regarding the character of motion of the reflecting body. Still another way consists in adjusting the two receiver outputs to the same level whereupon they may be led into the two adjacent arms of a balanced bridge. If one phase leads the other, the bridge becomes unbalanced and the two-way meter across the bridge deflects in one of its two possible directions. If the phase is reversed then the meter will deflect oppositely. Such a deflection may obviously be arbitrarily marked forward or backward. Still another scheme consists in using the so-called synchroscope of the type used in power plants. If the circuit were associated with a counter of maxima, it is feasible to make the output of the above schemes operate a clutch on the counter so as to make it go either forward or backward in step with the distant object, thereby integrating its net forward or backward motion. Methods of conducting operations of this kind are familiar in the art and consequently need not be discussed further here.

It is recognized that there is a very simple relationship between the measurement of a displacement and the measurement of velocity. In general one may say that the radio apparatus necessary for the measurement of velocity is essentially that used for the measurement of displacement. The difference lies mainly in the external circuits and in the method of treating the data. When the distant object is moving at a very low velocity it is obvious that the number of maxima and minima returned to the receiver per second is enough to determine its velocity. Any simple counting scheme is sufficient. If the velocity is considerable, say such as to give a return of maxima of a few tens of cycles per second, then one may use a vibrating reed type of counter. If the velocity is very high, such as might correspond to a return of several thousand maxima per second, as may be involved in reflections from moving airplanes, then any suitable form of audio frequency meters may be used.

What is claimed is:

1. Radio apparatus for determining the direction and velocity of a distant object, comprising a directive horn for launching hyperfrequency electromagnetic waves and two receiving horns, the three being mounted on a rotatable axis with the launching device between the two receivers, the two receivers being adapted to receive a portion of the direct wave and a portion of the wave reflected from the object, a separate detecting device for each receiving horn, each detector feeding to an audio indicating device a frequency dependent on the velocity of the object, and means for rotating the system of three horns giving rise to the binaural effect in the audio indicating devices.

2. A system for determining the direction of short electromagnetic waves originating at or reflected from a remote object, comprising four receiving horns mounted on alti-azimuthal axes, a separate detector for each of the said horns each detector supplying a signal to an audio indicating device, an additional equipment whereby the said four horns are simultaneously utilized for the reception of acoustic waves for the binaural location of the remote object, and means whereby the receiver electromagnetic waves are separated from the received acoustic waves.

3. Radio apparatus for determining the velocity and sense of direction of a remote moving object comprising a directive radio-wave transmitting horn, a directive receiving horn adjacent to said transmitting horn to receive waves reflected from the object, a pipe connection from the throat of the one horn to the throat of the other, two spaced detecting devices in the said connecting pipe, the detecting devices being responsive to the received wave traveling in the one direction and to direct waves from the transmitter traveling in the other direction, and means for translating the response of the two detectors into a binaural effect.

4. In an object locator or the like, means for launching radio waves into space, a pair of spaced antenna means for intercepting said waves after reflection from a distant object, said pair being rotatably mounted, a local source of oscillations having a frequency other than that of the intercepted waves, means for transmitting waves from said source and the intercepted waves through a common transducer, separate detectors for deriving separate beat frequency waves from said transmitted waves at spaced points along said transducer, and means for comparing the phases of said beat frequency waves.

5. A combination in accordance with claim 4 in which the frequency of said local oscillations and the frequency of the launched radio waves differ by an audible frequency.

6. A combination in accordance with claim 4 in which said last-mentioned means is adapted for binaural comparison of said beat frequency waves.

7. In an object locator or the like, means for transmitting electromagnetic waves of predetermined radio frequency to illuminate a distant object, means for receiving the said waves after reflection from said object comprising a plurality of wave interceptors spaced apart so that the relative phase of the waves arriving at said interceptors is a function of the angular bearing of said object, said plurality of interceptors being mounted as a unit for rotation, means for combining the waves received at one of said interceptors with a wave of fixed frequency substantially different than that of said transmitted waves to produce a wave of audible frequency, means for separately combining waves received at the other of said interceptors with a wave of said fixed frequency to produce another wave of the same audible frequency, and means for binaurally comparing said two waves of audible frequency.

8. The method of ascertaining the relative frequencies of two waves which comprises transmitting said waves through a common transducer, deriving from said waves the beat frequency wave at spaced points along said transducer and comparing the phases of the beat frequency waves so derived.

9. In an object locator or the like, means for launching radio waves into space, a plurality of radio wave interceptors spaced apart adjacent said launching means for intercepting said waves after reflection from a distant object, and a common receiver for said plurality of interceptors, said interceptors having such position relative to said launching means that there is excessive radio wave leakage directly from said launching means to said interceptors, and said launching means being so spaced from said several interceptors that at said common receiver the leakage power from at least one of said interceptors is in opposing phase relation with the leakage power from another of said interceptors.

10. A combination in accordance with claim 9 in which said launching means is so spaced from said interceptors that at said common receiver the vector sum of the leakage power from the several interceptors is negligible.

11. A combination in accordance with claim 9 in which there are a pair of said interceptors and said launching means is disposed nearer to one of said interceptors than to the other by an odd number of half wave-lengths.

12. An electrically conductive pipe, means for maintaining concurrently in the interior thereof superposed electromagnetic and acoustic waves, said pipe having a pair of branching passages connected thereto, and barrier means near the branching point for selectively controlling the passage of the two different types of waves between said pipe and said branching passages.

13. An electrically conductive pipe, means for transmitting electromagnetic and acoustic waves concurrently through the interior thereof and means for diverting one of said waves from said pipe without substantially interfering with the other.

14. The method of determining whether a wave of unknown frequency is of higher or lower frequency than a wave of given frequency which comprises deriving by modulation of both of said waves a first audio frequency wave; deriving by modulation of both of said waves, but with at least one of said waves displaced relative to the time phase of the same wave entering into said first-mentioned modulation, a second audio frequency wave; and binaurally comparing the phases of said first and second audio frequency waves.

15. In apparatus for locating the position of an object which moves with respect to a place of observation, the combination of means for generating high frequency waves, means for directing a portion of said waves toward said object, means for gathering the waves reflected from said object at a plurality of points near said place of observation and mixing the same with a directly-received portion of said high frequency waves to produce beats at each of said gathering points, means for detecting said beats and feeding the same to the ears of an operator to excit the binaural sense of the operator, whereby the operator is informed of the position of said object with reference to said place of observation.

16. The method of locating the position of an object which moves with respect to a place of observation, consisting in producing high frequency waves at the place of observation, directing said high frequency waves toward said object, gathering the waves reflected from said object at a plurality of points near said place of observation and mixing the same with a directly-received portion of said high frequency waves, utilizing the frequency difference between said directly-received high-frequency waves and said reflected waves which is caused by the movement of said object to produce a beat at each of said gathering points, detecting said beats and feeding the same to the ears of an operator to excite the binaural sense of the operator to inform the operator of the position of said object with reference to said place of observation.

17. In apparatus for locating an object which moves with respect to a predetermined station, means for producing at said station an alternating quantity having a predetermined frequency, said quantity comprising an alternating primary radiation of said predetermined frequency capable of reflection from said object, said radiation when incident on said object producing a reflected radiation having a frequency which differs from said predetermined frequency by an amount dependent on the rate of movement of the object in the line of travel of the incident radiation, means responsive to the beat frequency derived from the combination of said reflected radiation at a first point and said quantity for supplying an audible signal to a first ear of an operator, and means responsive to the beat frequency derived from the combination of said reflected radiation at a second point spaced from the first point and said quantity for supplying an audible signal to a second ear of an operator to excite the binaural sense of the operator, whereby the operator is informed of the presence of the object.

18. Radio apparatus for observing a remote reflecting object comprising antenna means for launching radio waves toward said object, antenna means for intercepting said radio waves after reflection from said object, a local source of oscillations having a frequency other than that of the intercepted waves, a high frequency transmission line, separate beat-frequency detectors coupled to said line at respective spaced points along said line, means for transmitting waves from said source through said transmission line and past each of said points in a given direction, means for transmitting said intercepted waves through said transmission line and past each of said points in the opposite directon, and means for comparing the phases of the beat-frequency waves detected by the said separate beat-frequency detectors.

19. In combination, antenna means for launching radio waves toward a remote reflecting object and intercepting said waves after reflection from said object, a local oscillation generator for supplying waves having a constant frequency differing from that of said intercepted waves, a high frequency transmission line, a pair of beat-frequency detectors coupled to said line at respective different points along its length, means for transmitting said intercepted waves and the said waves from said generator through said line in mutually opposite directions past each of said points, and means for binaurally comparing the beat-frequency waves detected by said pair of beat-frequency detectors.

20. Apparatus for comparing two waves of unequal high frequency comprising a high frequency transmission line, means to apply the two waves to be compared to said transmission line at respective different points whereby they are transmitted in mutually opposite directions through a portion of said line between said points, a pair of detectors coupled to said line at respective spaced points within said portion of line, and means for binaurally comparing the respective beat-frequency waves detected by the said detectors.

21. Apparatus for observing a remote moving object comprising a transmitting antenna, a receiving antenna, a source of radio frequency waves coupled to said transmitting antenna, a high frequency transmission line coupled to said source and to said receiving antenna at separate places along said line, a pair of beat-frequency detectors coupled to said line at respective spaced points between said places, and means for binaurally comparing the respective beat-frequency waves detected by said detectors.

22. Apparatus for comparing two waves of unequal high frequency comprising a high frequency transmission line, separate detectors coupled to said line at respectives spaced points along said line, means to apply one of said waves to said line for transmission therein past each of said points in a given direction, means to apply the other of said waves to said line for transmission therein past each of said points in the opposite direction, and means for binaurally comparing the respective beat-frequency waves detected by the said detectors.

GEORGE C. SOUTHWORTH.

REFERENCES CITED

The following references are of record in the file of this patent:

UNITED STATES PATENTS

| Number | Name | Date |
|---|---|---|
| 1,204,826 | Schiessler | Nov. 14, 1916 |
| 1,510,792 | Merritt | Oct. 7, 1924 |
| 1,924,156 | Hart | Aug. 29, 1933 |

(Other references on following page)

UNITED STATES PATENTS

| Number | Name | Date |
|---|---|---|
| 1,973,673 | Rice | Sept. 11, 1934 |
| 2,003,661 | Bassett et al. | June 4, 1935 |
| 2,116,717 | Scharlau | May 10, 1938 |
| 2,151,323 | Hollmann | Mar. 21, 1939 |
| 2,189,582 | Hineline | Feb. 6, 1940 |
| 2,200,023 | Dallenbach | May 7, 1940 |
| 2,203,807 | Wolff | June 11, 1940 |
| 2,206,683 | Wolff | July 2, 1940 |
| 2,231,929 | Lyman | Feb. 18, 1941 |
| 2,416,155 | Chubb | Feb. 18, 1947 |

FOREIGN PATENTS

| Number | Country | Date |
|---|---|---|
| 441,964 | Great Britain | Jan. 30, 1936 |
| 818,696 | France | June 21, 1937 |

OTHER REFERENCES

Short Wave and Television—April, 1938, page 669.

Proceedings of the I. R. E., vol. 28, No. 3; March 1940.

Wireless World, June 26, 1936, pages 623, 624.